Feb. 25, 1969           C. R. PETYT                 3,429,480
        DISPENSING APPARATUS FOR A BLEND OF TWO LIQUIDS
                    WITH COST INCREMENT MEANS
                       Filed March 27, 1967
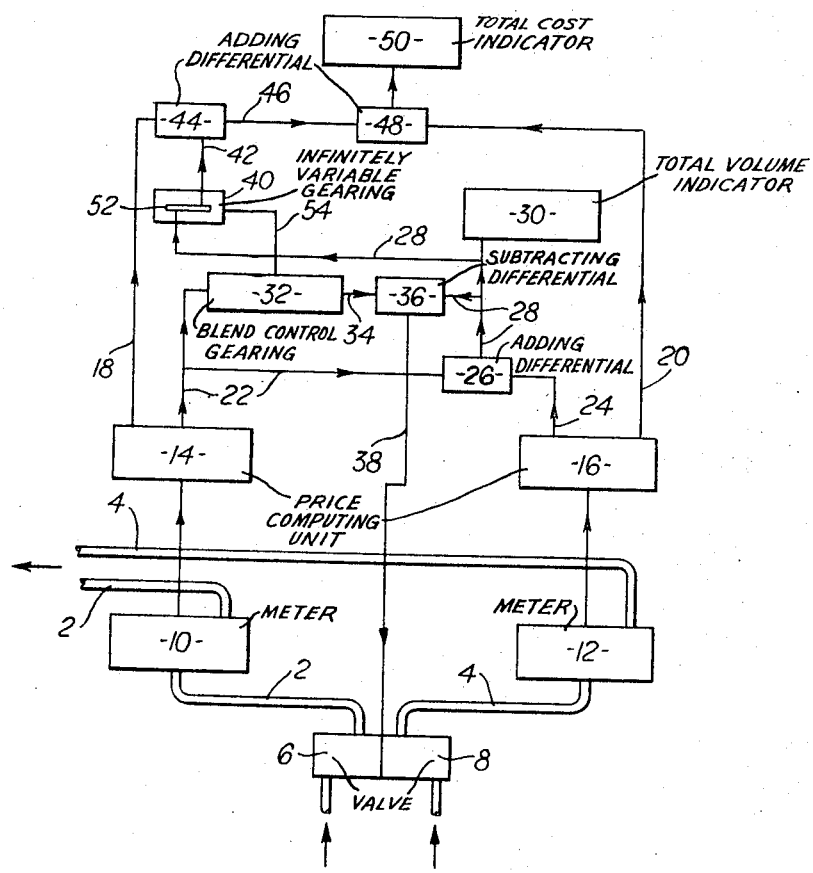
Inventor
Colin Roderick Petyt
By
Edwin E. Greigg
Attorney __United States Patent Office__

3,429,480
Patented Feb. 25, 1969

3,429,480
DISPENSING APPARATUS FOR A BLEND OF TWO LIQUIDS WITH COST INCREMENT MEANS
Colin Roderick Petyt, Hillingdon, Middlesex, England, assignor to Avery-Hardoll Limited, Chessington, Surrey, and Beck & Co. (Meters) Limited, London, England, both British companies
Filed Mar. 27, 1967, Ser. No. 626,062
Claims priority, application Great Britain, Apr. 5, 1966, 15,164/66
U.S. Cl. 222—26            7 Claims
Int. Cl. B67d 5/56; G01f 15/06

ABSTRACT OF THE DISCLOSURE

The invention relates to an apparatus for dispensing blends of two different liquids. A pumping unit draws liquid from a source of supply and conveys it through a meter system to a common outlet. The apparatus includes controls for flow of the liquids to be blended, computation of the particular blends involved with an increment being added to or subtracted from the output from the price computing means prior to the display of the total cost.

---

This invention relates to liquid fuel dispensing apparatus. It is especially concerned with apparatus for dispensing blends of two different liquids, e.g. two petrols of different octane rating or petrol and oil.

Such apparatus is normally of the type comprising for each of the liquids, a pumping unit which forces the liquid from a tank or the like through a meter to the output point, e.g. a nozzle, and means including variable gearing to control the flow of liquid through the various flow paths in accordance with the amounts of each liquid required for the particular blend chosen by the setting of the gears. The price of any blend of the liquids has hitherto been computed strictly on a proportional basis, i.e. by multiplying the volume of each of the liquids dispensed as measured by the relevant meter by the price per unit of that liquid and then adding the two monetary totals so calculated to give the final cost. This system, whilst being strictly accurate, has the disadvantage that final cost may include fractions of a penny and furthermore it gives no scope to the operator to adjust the price of any blend upwardly or downwardly without altering the basic price of one or other of the liquids being blended.

This disadvantage is overcome in apparatus of the type outlined above in accordance with this invention by adding, or subtracting an increment in the drive either of one or other of the individual computed prices prior to final summation or to the drive between a total summating device and the display pointer or indicator, the increment being the output from a variable gearing, preferably an infinitely variable gear, driven by a single drive representing the total volume of the blend being dispensed or by separate drives each representing the total volume of one of the liquids so that the increment is proportional to the total volume of the blended liquids.

Thus the increment can be pre-determined by the variable gear and the total amount of the increment, either positive or negative, which is included in the final cost is determined by the total volume of the liquids dispensed.

The amount of the increment is preferably determined by a drive transmitted from the variable gearing which determines the blend so that the infinitely variable gear is set automatically when the blend is changed.

The meters are driven by the passage of liquid therethrough and the output drive of each of the meters, which is indicative of the volumes of the liquids being dispensed, may be transmitted to separate price computing units which act to multiply the volume by the unit price of the particular liquid. The out-puts from the price computers are representative of the individual prices of the liquids being dispensed.

The increment is preferably added (or subtracted) to the output from one of the price computing devices (or the single device) by means of an adding differential, one of the input shafts of which is driven from the output shaft of the price computer and the other input shaft of which is driven from the infinitely variable gear, which in turn is driven from the output shaft of a differential adding the outputs of the two meters or by separate drives from each of the two meters. The output drive from the other price computer when provided is then added to the output drive from the differential at which the increment is added by means of a further adding differential, the output of which drives the total cost indicator.

The infinitely variable gear box may transmit its drive through a disc or discs and the connection between the disc and the blend selector gear box be made such that the effective disc radius is changed as the blend selector gearing is changed.

The means to control the quantities of each of the liquids dispensed in accordance with the desired blend can be such that the two meters are directly connected together and a pressure regulator is incorporated in the flow lines between the pumping units and the meters. Alternatively a blend valve may be located in each of the flow lines and the position of these valves be controlled by the output shaft of a subtracting differential, the input shafts of which are driven from the blend setting gear box and from a drive indicative of the total volume being dispensed, i.e. the summation of the output drives of both meters. If the quantity of one liquid being dispensed through one of the flow lines is greater or less than the necessary amount for the blend selected, the meter of that particular liquid will be driven at a speed greater than or less than that required to keep the valves in balance and the output of the subtracting differential will then adjust the valves in the two flow lines to decrease the rate of flow in the flow line through which too much liquid was flowing and to increase that in the flow line in which relatively too little liquid was flowing.

The invention will now be further described by way of example with reference to the accompanying drawing in which:

In the drawing there is shown a block diagram of one embodiment of apparatus in accordance with the invention illustrating the liquid and mechanical connections of various parts of the apparatus.

Referring at this time to the drawing, petrols of relatively high and low octane ratings are pumped by pump units (not shown) from separate sources of supply (also not shown) through separate flow lines 2 and 4 respectively. Each flow line passes through blend valves indicated at 6 and 8 and meters 10 and 12 respectively. The flow lines then pass to a common dispensing outlet, e.g. a nozzle.

The meters are driven by the passage of liquid therethrough and the output shafts of each of the meters drive the input shaft of standard price computing or variator gear units 14, 16 which act in known manner to multiply the volume as represented by the meter output by the unit price of each of the two petrols respectively. The output drives, indicated at 18, 20 of the two variators thus represent the proportional costs of the two petrols dispensed.

Second output shafts from each of the variators which are identical to the drives from the meters, i.e. they are not multiplied by the unit price, are indicated at 22, 24 and are added together by an adding differential 26, the output drive 28 of which drives a total volume indicator 30. The drive 22 from the meter 10, also psases through a blend gear box 32 the setting of which determines the relative amounts of each of the two petrols which are to be mixed to constitute the final blend. The output 34 from the gear box drives one of the input shafts of a subtracting differential 36, the other input shaft of which is driven from the output of the adding differential 26 representative of the total volume. Thus, the two drives to the subtracting differential are representative of the total volume and of the volume of one petrol, modified by the setting of the gear box 32. The output 38 of the subtracting differential is taken to the blend valves 6 and 8, and the arrangement is such that the output shaft of the subtracting differential 36 is operative to effect a correcting movement of the valves when the ratio of the liquids passing through the meters 10 and 12 varies from the ratio selected by the gear 32 so that the blend being dispensed is maintained constant.

An infinitely variable gear box 40 is driven by the drive 28 representing the added output of the two meters and drives, through a drive 42, one of the input shafts of an adding differential 44, the other input shaft of which is driven by the drive 18 representing the cost of that one of the petrols which is being dispensed through the flow line 2. Thus the increment, either positive or negative, can be added to the cost represented by the drive 18 depending upon the setting of the infinitely variable gear. The output drive 46 of the adding differential 44 drives one of the input shafts of a further adding differential 48, the other input shaft of which is driven by the drive 20, representing the cost of the petrol flowing through the flow line 4. The output of the differential 48 thus represents the total cost of the blend and this is indicated on an indicator 50.

It will be appreciated that the total cost is not a mere addition of the cost of the two individual petrols being dispensed because of the addition of the increment determined by the gear 40.

The infinitely variable gear 40, includes a friction disc diagrammatically illustrated at 52 and the operative radius at which the friction disc transmits its drive is changed by a drive connection 54, when the setting of the gears in the gear box 32 is changed. Thus the amount of the increment is changed when the blend is changed.

The amount of the increment can be set at the desire of the operator, and it may be that in order to simplify the setting, the two price variation units 14 and 16 are set to compute the same price per gallon, in which case the infinitely variable gear 40 would be arranged to transmit the full price increment for each blend setting.

The torque transmitted by the friction disc is kept to a minimum and will be proportionally the same to the full torque as the increment transmitted, is to the proportional price of the two liquids. As a matter of convenience the amount of the increment determined by the setting of the infinitely variable gear device 40, can be kept to say plus or minus 2d (in addition to the proportional change) for each blend. The arrangement will be such that when petrol from only one source is dispensed then no increment, either positive or negative, will be added to the cost.

I claim:

1. Apparatus for dispensing blends of two different liquids comprising, a pumping unit to draw each liquid from a supply and convey it through a separate meter to a common outlet point, means to control the flow of each of the liquids in accordance with the amounts of each liquid required for any particular blend chosen, a separate price computing unit for each of the two liquids receiving as an input the output of each of the meters respectively and acting to multiply the volume of its liquid by the price of the particular liquid, the outputs from the price computing units being added together further means wherein an increment is added to or subtracted from the output from the price adding means prior to the display of the total cost said further means being a variable gear device which device is driven by a drive means representing the total volume of the blend being dispensed, the output being said increment to the cost which is proportional to the total volume of the blended liquids.

2. Apparatus as claimed in claim 1 wherein the pumping unit comprises two pumping units and meters whereby a blend of any two liquids may be dispensed.

3. Apparatus as claimed in claim 2 in which the variable gear is an infinitely variable device which transmits its drive through disc means, the connection between the disc means and the blend selecting means being constructed so that the effective disc radius at which the drive is transmitted from the disc, is changed as the blend selector is changed.

4. Apparatus as claimed in claim 1 wherein the means to control the quantities of each of the liquids dispensed in accordance with the desired blend comprises a blend valve located in each of the flow lines the positions of the valves being controlled by the output shaft of a subtracting differential gearing the input shafts of which are driven from the blend selection control and by a drive indicative of the total volume of liquid being dispensed.

5. Apparatus as claimed in claim 1 in which the amount of the increment is determined by a drive transmitted from a control means which determines the relevant proportions of the liquids in the blend.

6. Apparatus as claimed in claim 1 in which the increment is computed with respect to the output from the price computing units by means of an adding differential gear arrangement one of the input shafts of the differential being driven from the output shaft of one of the price computing units and the other input shaft being driven from the variable gear device which in turn is driven from the output shaft of an adding differential gear which acts to sum the outputs of the meters.

7. Apparatus for dispensing blends of two different liquids as claimed in claim 1, wherein the variable gear device is driven by separate dual drive means each representing the total volume of one of the liquids respectively.

References Cited

UNITED STATES PATENTS

| 2,931,538 | 4/1960 | Young et al. | 222—26 |
| 3,082,945 | 3/1963 | Copony | 222—26 X |
| 3,232,484 | 2/1966 | Young | 222—26 |

SAMUEL F. COLEMAN, Primary Examiner.

H. S. LANE, Assistant Examiner.

U.S. Cl. X.R.

222—134